US012704659B2

(12) United States Patent
Yang et al.

(10) Patent No.: US 12,704,659 B2
(45) Date of Patent: Aug. 11, 2026

(54) METASURFACE, METALENS, AND METALENS ARRAY WITH CONTROLLABLE ANGULAR FIELD-OF-VIEW

(71) Applicant: The Regents of the University of California, Oakland, CA (US)

(72) Inventors: Weijian Yang, Redwood City, CA (US); Junjie Hu, Davis, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 373 days.

(21) Appl. No.: 18/263,268

(22) PCT Filed: Feb. 11, 2022

(86) PCT No.: PCT/US2022/016237

§ 371 (c)(1),
(2) Date: Jul. 27, 2023

(87) PCT Pub. No.: WO2022/174120

PCT Pub. Date: Aug. 18, 2022

(65) Prior Publication Data

US 2024/0118452 A1 Apr. 11, 2024

Related U.S. Application Data

(60) Provisional application No. 63/149,034, filed on Feb. 12, 2021.

(51) Int. Cl.
*G02B 1/00* (2006.01)
*G02B 3/00* (2006.01)
(Continued)

(52) U.S. Cl.
CPC ............. *G02B 1/002* (2013.01); *G02B 5/008* (2013.01); *G02B 5/1809* (2013.01); *G02B 5/1871* (2013.01); *G02B 3/00* (2013.01)

(58) Field of Classification Search
CPC ...... G02B 1/002; G02B 5/008; G02B 5/1809; G02B 5/1871; G02B 3/00
See application file for complete search history.

(56) References Cited

U.S. PATENT DOCUMENTS 8,681,428 B1 3/2014 Brown
2012/0328240 A1 12/2012 Ma et al.
(Continued)

OTHER PUBLICATIONS

Ren Jie Lin et al., "Achromatic metalens array for full-colour light-field imaging", Nature nanotechnology, vol. 14, Mar. 2019.
(Continued)

*Primary Examiner* — Phu Vu
(74) *Attorney, Agent, or Firm* — MARSHALL, GERSTEIN & BORUN LLP

(57) ABSTRACT

A metalens and a metalens array having a bounded angular field of view are disclosed. The metalens includes a substrate and a two-dimensional (2D) grid over the substrate to divide the substrate into a 2D array of meta-units. Each meta-unit in the 2D array includes a nanostructure and a portion of the substrate that supports the nanostructure. Moreover, each meta-unit is configured with an angular-dependent transmission or reflection coefficient that decreases with an increasing incident angle of an illumination. Moreover, the metalens passes an incident light having an incident angle less than a cutoff angle and rejects an incident light having an incident angle greater than the cutoff angle. The metalens can be used a base unit for constructing a metalens array by tiling copies of the metalens into a 2D array of the metalens to achieve a significantly larger field-of-view.

16 Claims, 10 Drawing Sheets

(51) Int. Cl.
*G02B 5/00* (2006.01)
*G02B 5/18* (2006.01)

(56) References Cited

U.S. PATENT DOCUMENTS

| | | | | |
|---|---|---|---|---|
| 2017/0082263 | A1* | 3/2017 | Byrnes | B82Y 20/00 |
| 2017/0212285 | A1 | 7/2017 | Arbabi et al. | |
| 2018/0275321 | A1* | 9/2018 | Kamali | G02B 27/4211 |
| 2019/0154877 | A1 | 5/2019 | Capasso et al. | |
| 2020/0225386 | A1 | 7/2020 | Tsai et al. | |
| 2020/0244343 | A1 | 7/2020 | Wigard et al. | |
| 2022/0190461 | A1* | 6/2022 | Kanamori | G02B 1/002 |

OTHER PUBLICATIONS

Qinyu Qian et al., “All-dielectric polarization-independent optical angular filter”, Scientific Reports, Nov. 29, 2017.

Qinyu Qian et al., “All-dielectric ultra-thin metasurface angular filter”, Optical Society of America, Aug. 7, 2019.

D. McGloin et al., “Bessel beams: Diffraction in a new light”, Contemporary Physics, Nov. 8, 2010.

Sang-Eun Mun et al., “Broadband circular polarizer for randomly polarized light in few-layer metasurface”, Scientific Reports, Feb. 22, 2019.

Haowen Liang et al., “High performance metalenses: numerical aperture, aberrations, chromaticity, and trade- offs”, Optical Society of America, Nov. 22, 2019.

Marc Levoy et al., “Light Field Microscopy”, Association for Computing Machinery, 2006.

Benedikt Groever et al., “Meta-Lens Doublet in the Visible Region”, Nano Letters, 2017.

Lingling Huang et al., “Metasurface holography: from fundamentals to applications”, Nanophotonics, 2018.

Amir Arbabi et al., “Subwavelength-thick lenses with high numerical apertures and large efficiency based on high-contrast transmitarrays”, Nature Communications, May 7, 2015.

Craig Snoeyink et al., “Three-dimensional locating of paraxial point source with axicon”, Optics Letters, vol. 37, No. 11, Jun. 1, 2012.

Filiz Yesilkoy et al., “Ultrasensitive hyperspectral imaging and biodetection enabled by dielectric metasurfaces”, Nature Photonics, vol. 13, Jun. 2019.

* cited by examiner

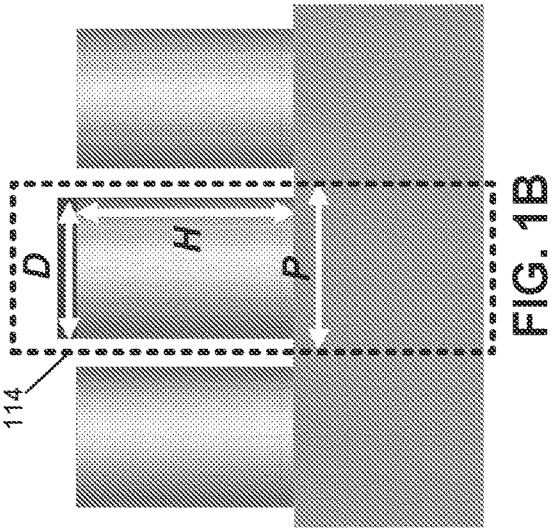
FIG. 1B
METALENS 100
112
114
102
104
FIG. 1A
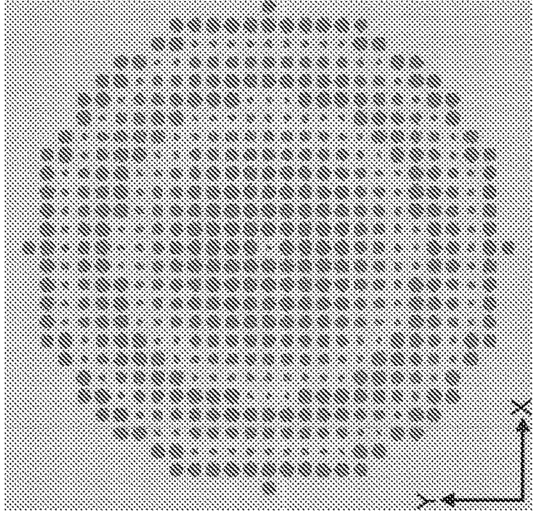
FIG. 1C

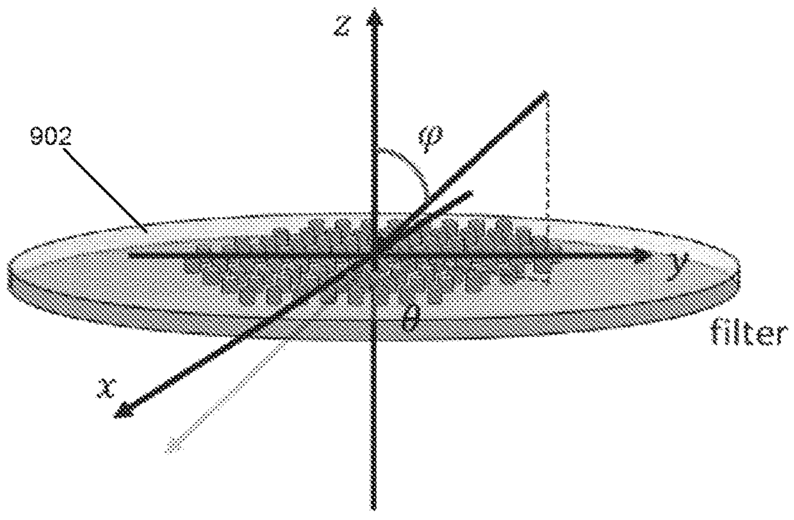
FIG. 9A
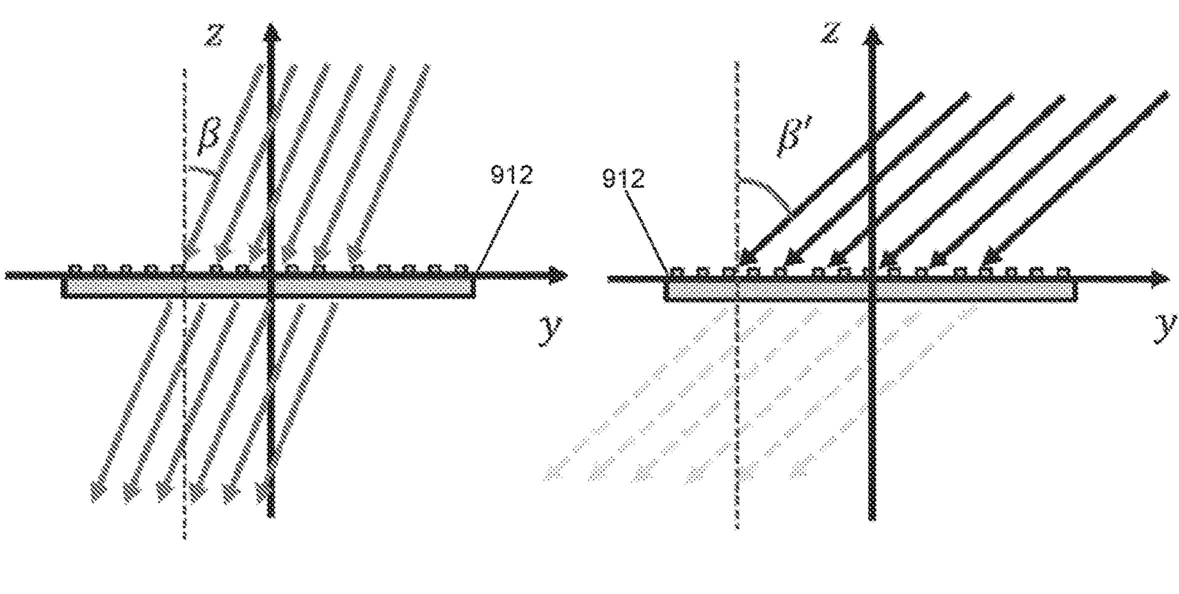
FIG. 9B
FIG. 9C

METASURFACE, METALENS, AND METALENS ARRAY WITH CONTROLLABLE ANGULAR FIELD-OF-VIEW

CROSS-REFERENCE TO RELATED APPLICATION

This application claims the benefit of U.S. Provisional Patent Application Ser. No. 63/149,034, entitled "Metasurface, Metalens, and Metalens Array with Controllable Angular Field-of-View Method and Devices," filed on 12 Feb. 2021, the contents of which are incorporated by reference herein.

GOVERNMENT LICENSE RIGHTS

This invention was made with U.S. government support under grant number R21EY029472 awarded by the National Institutes of Health (NIH). The U.S. government has certain rights in the invention.

BACKGROUND

Field

The disclosed embodiments generally relate to optical imaging devices and techniques. More specifically, the disclosed embodiments relate to the designs of metasurfaces, metalenses and metalens arrays with angular-dependent field-of-view for two-dimensional (2D) and for three-dimensional (3D) imaging applications.

Related Art

Metasurfaces are a novel photonic devices that have distinct optical properties. A metasurface is generally composed of a thin substrate supporting an array of artificially-designed nanostructures, which are also referred to as meta-units. Metasurfaces have been gaining popularity for constructing optical modules because of their design flexibilities and numerous potential applications. The applications of metasurfaces include polarization, holography, hyperspectral imaging, and high-resolution imaging, among others. Although metasurfaces are ideal for building compact optical systems and devices, existing metasurface-based optical devices typically have constraints on allowable field-of-view to control geometric aberrations and crosstalk in the image plane. This limits the potential of metasurfaces in large field-of-view applications.

Hence, what are needed are meta-unit and metasurface designs for constructing optical modules without the drawbacks of existing devices and techniques.

SUMMARY

This disclosure provides meta-unit and metasurface designs that enable angular-dependent transmissions or reflections. In some embodiments, meta-units and metasurfaces with angular-dependent transmissions or reflections are used to construct metalenses with bounded angular field-of-views (FOVs). The disclosed metalens with bounded angular FOV can then be tiled into a metalens array to extend the overall angular and linear FOVs. The disclosed metalens arrays with both bounded local FOVs and large overall FOVs can be used in compact imaging systems to perform large FOV two-dimensional (2D) imaging and three-dimensional (3D) imaging. In some embodiments, meta-units and metasurfaces with angular-dependent transmissions or reflections are also used to construct metasurface angular filters. The disclosed metalenses arrays and metasurface angular filters can also be used in miniaturized imaging devices, light-field cameras, compact cameras, endoscopy, biomedical imaging, consumer electronics, surveillance systems, and elsewhere.

Note that existing metasurface designs and applications neither specifically pay attention to the angular-dependent transmission intensity and phase of the metasurface, nor the angular-dependent reflection intensity and phase of the metasurface. This disclosure provides metasurface designs that effectuate angular-dependent transmission or reflection intensity. Meanwhile, within the high transmission intensity or high reflection intensity region, the disclosed metasurface designs can also achieve a nearly angular-independent transmission phase shift or reflection phase shift. For example, when a plane wave is used to illuminate the disclosed metasurface, the transmission or reflection intensity will drop rapidly once the angle of incidence is greater than a particular cutoff angle. However, when the angle of incidence is smaller than the cutoff angle, the transmission light or reflection light will experience nearly the same amount of phase change for different angles of incidence. A disclosed metasurface having the above transmission or reflection properties can be used to construct a metalens with a bounded FOV, a metalens array with bounded local FOVs for compact imaging systems that can perform large FOV 2D imaging, a metalens array for compact imaging systems that can perform a large FOV 3D imaging, and metasurface angular filters.

In some embodiments, a procedure of designing a metasurface with angular-dependent transmission or reflection intensity is provided. The design procedure may start with the simulation of a periodic arrangement of identical meta-units. In the simulation process, multiple design parameters of a meta-unit can be explored, wherein these design parameters can include but are not limited to, the geometry of a nanostructure within the meta-unit (e.g., the shape, the diameter if the nanostructure has a circular cross-section, the length if the nanostructure is a rectangle, the thickness/height of the nanostructure, etc.), refractive index of the nanostructure material, refractive index of the substrate of the meta-unit, refractive index of the superstrate of the meta-unit, and the periodicity of the meta-units. Note that the nanostructure within the meta-unit can be nano-posts or nanoholes, and can have different geometries including, but not limited to, circle, ellipse, square, rectangle, triangular, star, among others.

In one aspect, a metalens having a bounded angular field of view is disclosed. This metalens includes a substrate and a two-dimensional (2D) grid over the substrate, dividing the substrate into a 2D array of meta-units. Each meta-unit in the 2D array further includes a nanostructure and a portion of the substrate that supports the nanostructure. Moreover, each meta-unit is configured with an angular-dependent transmission or reflection coefficient that decreases with an increasing incident angle of an illumination, and the angular-dependent transmission or reflection coefficient substantially becomes zero when a predetermined cutoff angle is reached. Hence, the metalens passes an incident light having an incident angle less than the predetermined cutoff angle and rejects an incident light having an incident angle greater than the predetermined cutoff angle.

In some embodiments, the nanostructure includes a nanapost or a nanohole/nanowell.

In some embodiments, the nanostructure is a nanopost constructed with a circular cross-section and specified by a diameter and a height.

In some embodiments, different nanoposts inside different meta-units in the 2D array have different diameters.

In some embodiments, the metalens has a center location, and a plurality of nanoposts in the 2D array that have substantially the same distance to the center location have the same diameter.

In some embodiments, when the metalens is used for imaging an object, either the nanostructure side of the metalens or the substrate side of the metalens can be selected to face the object.

In some embodiments, each nanostructure can be positioned inside the respective meta-unit either at the center of the meta-unit or at an off-centered position within the respective meta-unit.

In some embodiments, the metalens is configured to have a spatial phase-shift profile for a given wavelength that mimics a target spatial phase-shift profile of a conventional optical lens.

In some embodiments, each nanostructure inside a given meta-unit in the 2D array is configured to effectuate an amount of phase-shift on an incident light at the given wavelength based on the target spatial phase-shift profile and a distance between the nanostructure and the center location of the metalens.

In some embodiments, the nanostructure is made of polysilicon and the substrate is made of fused silica.

In some embodiments, the metalens is used to construct a lens element within a compact optical imaging system configured for either transmission-mode or reflection-mode 2D imaging.

In some embodiments, the metalens is used to construct a lens element within a compact optical imaging system configured for either transmission-mode or reflection-mode three-dimensional (3D) imaging.

In some embodiments, the 2D array of meta-units has constant spacing between adjacent meta-units in one or both dimensions of the 2D array.

In another aspect, a metalens array having a bounded local field of view and a large combined field of view (FOV) is disclosed. This metalens array includes an M×N (M by N) array of metalens units, wherein each metalens unit in the M×N array is configured with a bounded local angular FOV such that each metalens unit operates to pass an incident light emitted inside the bounded local angular FOV of the metalens unit and reject an incident light emitted inside another bounded local angular FOV associated with another metalens unit in the M×N array adjacent to the metalens unit. Moreover, the metalens array has an overall two-dimensional FOV determined by the sum of the M×N bounded local angular FOVs associated with the M×N metalens units.

In some embodiments, each metalens unit in the M×N array of metalens units includes a 2D array of meta-units. Each meta-unit in the 2D array of meta-units further includes a substrate support; and a nanostructure disposed on the substrate support. Note that each nanostructure inside a meta-unit is configured to pass an incident light having an incident angle less than a predetermined cutoff angle and reject an incident light having an incident angle greater than the predetermined cutoff angle.

In some embodiments, each metalens unit is configured with an angular-dependent transmission or reflection coefficient that decreases with an increasing incident angle of an illumination and becomes substantially zero at the predetermined cutoff angle.

In some embodiments, each metalens unit in the M×N array is configured with an imaging magnification less than 1 so that objects in boundary regions between two local angular FOVs do not overlap in an image plane.

In some embodiments, each metalens unit in the M×N array is configured with a numerical aperture that is matched with the bounded local angular FOV.

In some embodiments, the metalens array is directly attached to an image sensor to form a compact camera system.

In some embodiments, the metalens array is directly attached to one end surface of a fiber buddle in an endoscope camera system, and indirectly coupled to an image sensor through the fiber buddle.

In some embodiments, the metalens array is scaled up by tiling more identical metalens units in each dimension of the M×N array to obtained an even larger linear FOV.

In some embodiments, the nanostructure is a nanopost having a circular cross-section and is specified by a diameter and a height. Note that different nanoposts inside different meta-units in the 2D array have different diameters.

In some embodiments, the metalens unit is configured to have a spatial phase-shift profile for a given wavelength that mimics a target spatial phase-shift profile of a conventional optical lens.

In some embodiments, each nanostructure inside a given meta-unit in the 2D array is configured to effectuate an amount of phase-shift on an incident light at the given wavelength based on the target spatial phase-shift profile and a distance between the nanostructure and the center location of the metalens.

In some embodiments, the metalens array is used as an optical lens element within a compact optical imaging system configured for transmission-mode 2D or 3D imaging.

In some embodiments, the compact optical imaging system is an endoscope.

In some embodiments, the metalens array is used as an optical lens element within a compact optical imaging system configured for reflection-mode 2D or 3D imaging.

In yet another aspect, a process for designing a metalens or a metalens array that mimics a regular optical lens is disclosed. This process begins by constructing a database of transmission-phase profiles and transmission-coefficient profiles over a full range of incident angles for multiple ranges of geometric configurations of a meta-unit. Note that the meta-unit is composed of a nanostructure disposed on a substrate support. A target angular-dependent transmission profile is then received. Next, from the database, a subset of the geometric configurations of the meta-unit from the multiple ranges of geometric configurations having associated transmission-coefficient profiles are selected that satisfy the target angular-dependent transmission profile. Subsequently, a metalens is constructed by arranging the selected subset of geometric configurations of the meta-unit into a two-dimensional (2D) array of meta-units to match the transmission-phase at each meta-unit location of the 2D array.

In some embodiments, the database of transmission-phase profiles and transmission-coefficient profiles is constructed by first selecting a physical design of the meta-unit among a plurality of meta-unit designs and then computing transmission coefficients and phase shifts effectuated by the selected meta-unit for incident plane waves over the full range of incident angles while sweeping a set of geometric parameters of the physical design.

In some embodiments, the target angular-dependent transmission profile is a transmission-coefficient curve that decreases with an increasing incidence angle and drops to zero at a predetermined cutoff angle.

In some embodiments, the physical design is a nanopost, and the set of geometric parameters includes a diameter of the nanopost, a height of the nanopost, and a size of the substrate support of the nanopost.

In some embodiments, the selected subset of geometric configurations of the meta-unit corresponds to a range of diameters of the nanopost with keeping the height of the nanopost constant.

In some embodiments, the selected subset of geometric configurations of the meta-unit has corresponding transmission-phase profiles that cover a 2π range of phases.

In some embodiments, the process arranges the selected subset of geometric configurations of the meta-unit into the 2D array by placing each meta-unit based on the distance of the meta-unit to the center of the metalens to satisfy a radius-dependent lens phase profile.

In some embodiments, the process constructs a metalens array using the metalens as a base unit by tiling copies of the metalens into a 2D array of the metalens to achieve a significantly larger field-of-view (FOV) than the FOV associated with each meta-lens.

In some embodiments, the metalens array has substantially the same target angular-dependent transmission profile as the metalens.

In some embodiments, the target optical lens can include any type of optical lens, such as a convex lens, a concave lens, or a deflector.

In still another aspect, a metasurface angular filter is disclosed. This metasurface angular filter includes a substrate and a two-dimensional (2D) grid over the substrate, dividing the substrate into a 2D array of meta-units. Each meta-unit in the 2D array further includes a nanostructure and a portion of the substrate that supports the nanostructure. Each meta-unit in the 2D array of meta-units is configured with an angular-dependent transmission profile so that the metasurface angular filter passes incoming light wave having an angle of incident less than a predetermined acceptance angle and rejects or significantly attenuates incoming light wave having an angle of incident greater than the predetermined acceptance angle.

In some embodiments, after passing through the metasurface angular filter, the angle of propagation of the first incoming light wave having an angle of incident less than a predetermined acceptance angle is substantially the same as the angle of incident.

In some embodiments, the angular-dependent transmission profile is symmetric in the 2D plane of the 2D array of meta-units.

BRIEF DESCRIPTION OF THE FIGURES

FIG. 1A illustrates the side-view of an exemplary metalens in accordance with the disclosed embodiments.

FIG. 1B illustrates the zoom-in view of a portion of the exemplary metalens in FIG. 1A highlighting a single meta-unit, in accordance with the disclosed embodiments.

FIG. 1C illustrates the top view of the exemplary metalens in FIG. 1A, in accordance with the disclosed embodiments.

FIG. 9A shows a 3D representation and filtering operation of a disclosed metasurface angular filter in accordance with the disclosed embodiments.

FIG. 9B shows a 2D side-view and a first type of filtering operation of the disclosed metasurface angular filter in accordance with the disclosed embodiments.

FIG. 9C shows the same 2D side-view but the second type of filtering operation of the disclosed metasurface angular filter, in accordance with the disclosed embodiments

DETAILED DESCRIPTION

Figures 2A, 2B, 2C:
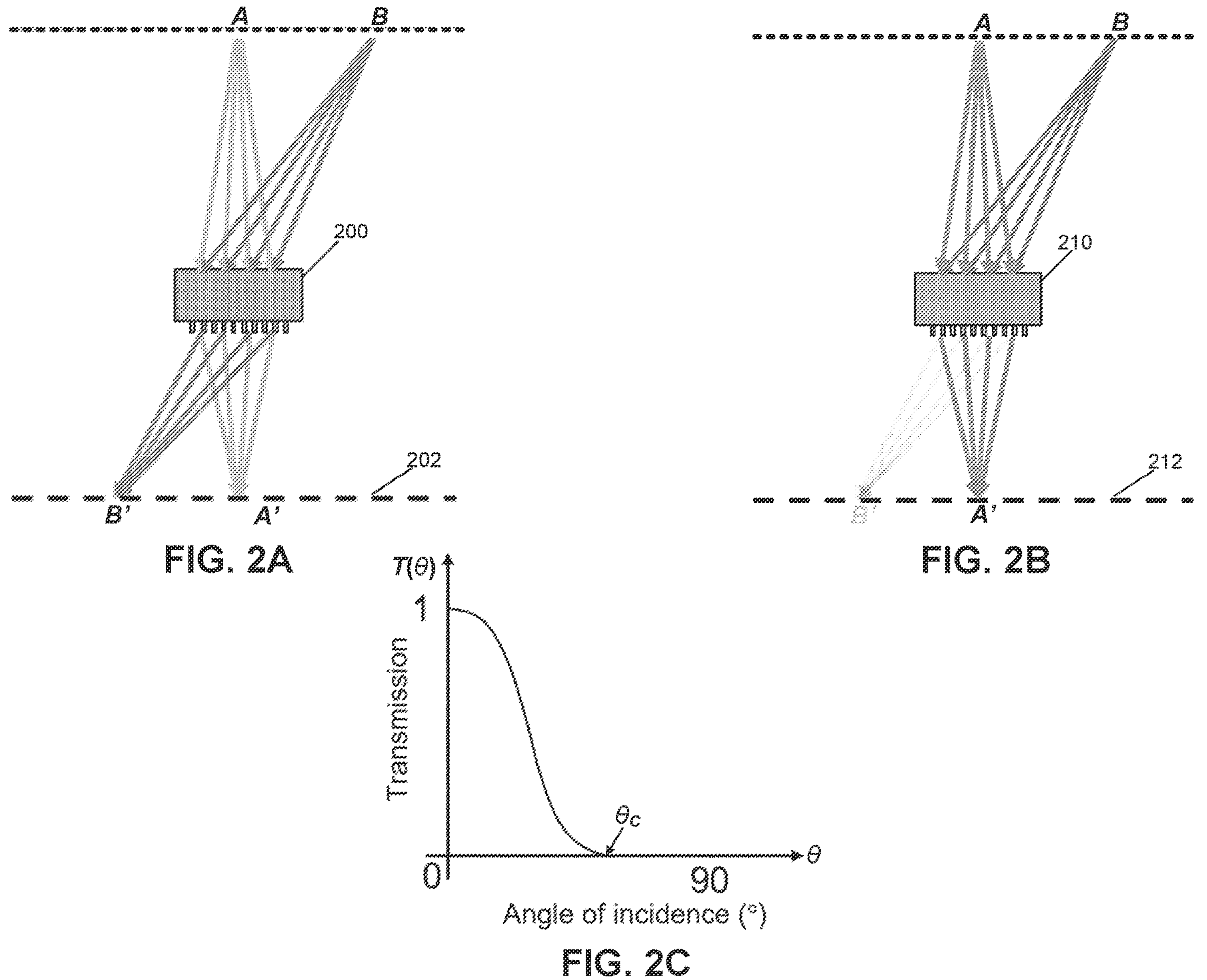
FIG. 2A shows a conventional metalens design that does not have a bounded angular FOV.
FIG. 2B shows a proposed metalens design having a bounding angular FOV in accordance with the disclosed embodiments.
FIG. 2C shows an exemplary transmission-coefficient profile $T(\theta)$ with a cutoff angle $\theta_C$ in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Terminology

Throughout this patent disclosure, the terms “transmission coefficient” and “transmission intensity” are used interchangeably as a measure of how much of an incident light wave passes through an optical element.

Overview

This disclosure provides meta-unit and metasurface designs that enable angular-dependent transmissions or reflections of meta-units and metasurfaces. In some embodiments, meta-units and metasurfaces with angular-dependent transmissions or reflections are used to construct metalenses with bounded angular field-of-views (FOVs). The disclosed metalens with bounded angular FOV can then be tiled into a metalens array to extend the overall angular and linear FOVs. The disclosed metalens arrays with both bounded local FOVs and large overall FOVs can be used in compact imaging systems to perform large FOV two-dimensional (2D) imaging. In some embodiments, meta-units and metasurfaces with angular-dependent transmissions or reflections are also used to construct metasurface angular filters. The disclosed metalenses arrays and metasurface angular filters can also be used in miniaturized imaging devices, light-field cameras, compact cameras, endoscopy, biomedical imaging, consumer electronics, and surveillance systems, among others.

Note that existing metasurface designs and applications neither specifically pay attention to angular-dependent transmission intensity and phase of the metasurface, nor the angular-dependent reflection intensity and phase of the metasurface. This disclosure provides metasurface designs that effectuate angular-dependent transmission or reflection intensity. Meanwhile, within the high transmission intensity or high reflection intensity region, the disclosed metasurface designs can also achieve a nearly angular-independent transmission phase shift or reflection phase shift. For example, when a plane wave is used to illuminate the disclosed metasurface, the transmission or reflection intensity will drop rapidly once the angle of incidence is greater than a particular cutoff angle. However, when the angle of incidence is smaller than the cutoff angle, the transmission light or reflection light will experience nearly the same amount of phase change for different angles of incidence. A disclosed metasurface having the above transmission or reflection properties can be used to construct a metalens with a bounded FOV, a metalens array with bounded local FOVs for compact imaging systems that can perform large FOV 2D imaging, a metalens array for compact imaging systems that can perform a large FOV 3D imaging, and metasurface angular filters.

In some embodiments, a procedure of designing a metasurface with angular-dependent transmission or reflection intensity is provided. The design procedure may start with the simulation of a periodic arrangement of identical meta-units. In the simulation process, multiple design parameters of a meta-unit can be explored, wherein these design parameters can include but are not limited to, the geometry of a nanostructure within the meta-unit (e.g., the shape, the diameter if the nanostructure has a circular cross-section, the length if the nanostructure is a rectangle, the thickness/height of the nanostructure, etc.), refractive index of the nanostructure material, refractive index of the substrate of the meta-unit, refractive index of the superstrate of the meta-unit, and the periodicity of the meta-units. Note that the nanostructure within the meta-unit can be nano-posts or nanoholes, and can have different geometries including but not limited to, circle, ellipse, square, rectangle, triangular, star, among others.

During the design simulation, the above design parameters of the meta-unit and the incident angles of an illumination light are swept, and the phases (e.g., in terms of a retardance) and intensities of both the transmitted and reflected light for a specific light wavelength and polarization are computed and collected. Eventually, a database of transmission/reflection phase and intensity versus meta-unit design parameters and light incident angles is obtained. The design procedure can then select from the database those meta-unit configurations that have a desirable cutoff angle for a specific application. The design procedure can then be extended to construct a metalens based on the selected meta-unit configurations having substantially identical bounded angular FOV but different phase transformation properties. More specifically, a metalens can be constructed using the selected meta-unit configurations by arranging meta-units of different geometric configurations within a metasurface in a specific manner, so that the arranged meta-unit array effectuates the specific spatial phase profile of a targeted optical lens, such as a convex lens, a concave lens, or a deflector, among others.

Meta-Unit, Metasurface and Metalens with Bounded Angular Field-of-View

One main application of a metasurface configured with an angular-dependent transmission coefficient is for constructing a metalens with a bounded angular field of view (FOV). FIG. 1A is a side-view of an exemplary metalens 100 in accordance with the disclosed embodiments. As can be seen in FIG. 1A, metalens 100 is composed of a group of densely-packed nanoposts 102 made of a first type of dielectric material (e.g., silicon) disposed on top of a substrate layer 104 of a second type of dielectric material (e.g., silicon dioxide). In some embodiments, nanoposts 102 are arranged on a two-dimensional (2D) periodic grid of unit cells (also referred to as the "meta-units"), wherein each nanopost in nanoposts 102 is positioned inside a given meta-unit in the 2D periodic grid. Note that the 2D periodic grid can be configured with the same period in both dimensions so that all meta-units have the same square shape and size. For example, the meta-units in metalens 100 can have a size in the order of 100 nm (i.e., ~0.1 μm) to 1000 nm (i.e., ~1 μm) in both dimensions. Hence, to construct a metalens with an area of a few $mm^2$, thousands of such periods/meta-units in each dimension of metalens 100 would typically be needed.

FIG. 1B is a zoom-in view of a portion 112 of the exemplary metalens 100 in FIG. 1A highlighting a single meta-unit 114, in accordance with the disclosed embodiments. As can be seen in FIG. 1B, meta-unit 114 in the exemplary metalens 100 is composed of a nanopost and a portion of the substrate that supports the nanopost. The nanopost within meta-unit 114 can be specified by a number of geometric parameters such as the diameter D (or the radius) of the nanopost and the height H of the nanopost. In addition, meta-unit 114 can also be specified by a period P that is also the period of the meta-unit array. Note that by changing the diameter D and/or the height H of the nanopost within meta-unit 114, the phase retardance effect of the nanopost on an incident plane wave can be modified. Note also that the diameter D of the nanoposts in different meta-units at different locations across metalens 100 can be different from one another.

Each meta-unit in metalens 100 operates by changing the phase of an incident plane wave on one side of the meta-unit after the plane wave emerges from the other side of the meta-unit. By changing the geometric parameters of the meta-units such as the diameters and the heights of the nanoposts, and positions of the nanoposts within the respective meta-units (i.e., relative to the portion of the substrate), metalens 100 can be configured into different phase profiles for different imaging applications.

FIG. 1C is a top view of the exemplary metalens 100 in FIG. 1A in accordance with the disclosed embodiments. As can be seen in FIG. 1C, metalens 100 is composed of a 2D array of meta-units that may have the same grid period in both X and Y dimensions. However, the nanoposts (i.e., the dark grey dots) in the 2D array have varying diameters D across metalens 100, which indicates that metalens 100 has varying spatial phase profiles at different X-Y locations on the surface of metalens 100.

For example, when the phase profiles of the meta-units within metalens 100 are properly designed based on their distances to the center of metalens 100, metalens 100 can have an overall spatial phase profile that mimics the spatial phase profile of a bulk optical lens. However, the thickness of metalens 100 (i.e., height H of the nanopost plus the substrate thickness) is significantly less than the thickness of a bulk lens. Hence, compared with a conventional optical lenses, the metalens provides a significantly increased compactness and the design of the metalens has a much higher degree of flexibility. With careful design, a single metalens can obtain advanced optical functionalities that would normally require a compound structure using a bulk lens design, such as for chromatic aberration correction. Because of the compact nature of metalenses, especially in terms of thickness, metalenses are becoming the preferred choice for highly-compact imaging systems, such as endoscopes for medical and biological investigations.

We now describe the concept of designing a metasurface with angular-dependent transmission coefficient, e.g., in terms of intensity, and using such a metasurface to implement metalenses with bounded angular FOV.

FIG. 2A shows a conventional metalens design 200 that does not have a bounded angular FOV. As can be seen in FIG. 2A, both an object point source A within a small angular position with respect to metalens 200 and another object point source B from a wide angular position with respect to metalens 200 can be well-imaged onto the sensor plane 202, including strong images A' and B'. FIG. 2B shows a proposed metalens design 210 having a bounding angular FOV in accordance with the disclosed embodiments. As can be seen in FIG. 2B, object point source A, which is within a designed FOV of metalens 210, is successfully imaged onto the sensor plane 212. In contrast, object point source B, which is outside of the designed FOV of metalens 210 is strongly rejected by metalens 210, which results in a very weak image B' on sensor plane 212.

In various embodiments, designing a metasurface with angular-dependent transmission coefficient begins with the design of the meta-units. Generally speaking, the meta-units that are commonly used for metalens designs can be classified into two types based on how they effectuate phase retardance on an incidence light. Both types of meta-units can have a bounded angular FOV when properly designed. The first type of meta-unit operates in the manner of a short waveguide, and is typically constructed in the form of a nanopost on a dielectric substrate. As described above in conjunction with FIGS. 1A-1C, the phase retardance introduced by the first type of meta-unit depends on the specific geometric parameters of the nanoposts and the meta-units, including but not limited to, the radius/diameter and the height of the nanoposts, and the periods between meta-units. To simplify the design of a metalens using such meta-units, the period P of the meta-unit array in both dimensions and the height of the nanoposts within each meta-unit can be fixed. As such, the phase retardance profile of the constructed metalens primarily depends on the radius/diameter of the nanopost within each meta-unit.

The second type of meta-unit typically has a fixed geometry, which is usually configured as a nanofin or nanowell. Hence, the phase retardance introduced by the second type of meta-unit is generally proportional to the rotation angle of the nanofins. Note that both the first and second types of meta-units can have a bounded angular FOV when properly designed. In the discussion below, the first type of meta-unit based on the nanoposts is used as an example to describe the design procedure of a metalens having a bounded angular FOV. However, the below-described design concepts can also be applied to the second type of meta-unit to design a metalens based on nanofins or nanowells having a bounded angular FOV without departing from the present techniques. Moreover, while the meta-unit and metalens design concepts are described below based on meta-units and metalenses in transmission configurations, these design concepts can also be applied to the designs of meta-units and metalenses in reflection configurations without departing from the scope of the present techniques.

In some embodiments, the metalens design procedure starts with building a design database of meta-units. Specifically, we build a 2D array structure composed of equal-sized meta-units, wherein each meta-unit in the 2D array structure contains an identical nanopost. Next, the transmission coefficients (e.g., in terms of the transmission intensity) and phase changes caused by the meta-unit in terms of phase retardance for different incident plane waves at different incident angles are computed while varying/sweeping the period of the 2D array structure and geometric parameters (e.g., radius and height) of the nanopost in the 2D array structure. In this manner, we can obtain a database of transmission-phase and transmission-coefficient profiles for different geometric parameter configurations of the nanoposts and meta-units over a full range of light incident angles.

From this acquired phase and transmission-coefficient profile database, we then select a subset of the geometric configurations of the nanopost and the meta-units that can effectuate the intended bounded angular FOV. In other words, each selected nanopost configuration in the corresponding 2D meta-unit array structure has a similar angular-dependent transmission profile $T(\theta)$ of a decreasing transmission coefficient for an increasing angle of incidence $\theta$ and a similar cutoff angle of $T(\theta)$. Moreover, the selected subset of nanopost designs should effectuate phase changes/shifts that cover the full $2\pi$ range. In some embodiments, the selected subset of nanopost configurations that satisfies both the angular-dependent transmission profile requirement and phase change requirements corresponds to a range of nanopost radii/diameters while keeping the nanopost height and the dimensions of the substrate structure constant.

After identifying the subset of nanopost configurations from the 2D meta-unit array simulations, a metasurface that has a specific spatial phase profile (e.g., of a bulk lens) for a specific application (e.g., imaging) can then be constructed. As has been described above, the nanoposts in different meta-units across the metasurface can have different sizes depending on the applications. For example, to construct a metasurface as a metalens, the spatial phase profile of the metasurface should possess the phase transformation behavior of a regular lens. More specifically, the spatial phase profile of the metasurface can be designed based on the ideal lens phase profile described by the following phase change versus radius relationship:

$$\varphi(r) = -\frac{kr^2}{2f}, \qquad (1)$$

where $\kappa$ is the wavevector, f is the designed focal length, and r is the radius. Note that the spatial phase profile of an ideal lens can be converted into a spatial distribution of nanopost geometric parameters, such as the nanopost diameters. Hence, by arranging meta-units within a metasurface using a subset of the selected nanopost configurations having proper phase retardance profiles, a metalens that has the spatial phase profile of an ideal lens can be obtained. An example of a metalens with arranged spatial distribution of the nanoposts of varying radius is illustrated in FIG. 1C.

Because the metalens is constructed with nanoposts from the selected subset of nanopost configurations having the same or substantially the same angular-dependent transmission profile $T(\theta)$ with a specific cutoff angle, the constructed metalens will also have the angular-dependent transmission profile to effectuate the bounded angular FOV with the specific cutoff angle. Hence, when the constructed metalens is subsequently illuminated with plane waves, the metalens only allows those plane waves with incident angles smaller than the specific cutoff angle to pass through. This means that when this metalens is used to image object point sources in an object plane, the metalens will have a bounded linear FOV in the object plane.

Moreover, a given meta-unit at a distance r to the center of the constructed metalens will effectuate a phase change for the incident light at the designed wavelength that satisfies Eqn. (1). As a result, a metalens having both the spatial phase profile of an ideal lens and a bounded angular FOV is obtained. FIG. 2C shows an exemplary transmission-coefficient profile $T(\theta)$ with a cutoff angle $\theta_C$ in accordance with the disclosed embodiments. By designing angular-dependent transmission-coefficient profile $T(\theta)$ with a design-specific cutoff angle $\theta_C$, we can control the bounded angular FOV of a meta-unit or a meta-lens designed based on that specific angular-dependent transmission-coefficient profile $T(\theta)$. Hence, the disclosed meta-units and meta-lenses have bounded angular FOVs that are fully controllable by design.

An exemplary metalens designed using the above-described design procedure for wavelength $\lambda$ at 1.31 μm can have the following configurations. Assuming that in each meta-unit the nanopost is made of polysilicon and the substrate is made is fused silica, the refractive index of polysilicon at the given wavelength is 3.45 and 1.46 for the fused silica. The meta-unit array period is 0.85 μm. The nanopost height is 0.84 μm. The nanopost radius in the exemplary metalens is in the range of 140 nm to 340 nm. For the constructed metalens with radius of 0.5 mm, the number of meta-units is $\sim 1.4\times10^6$.

Figure 3:
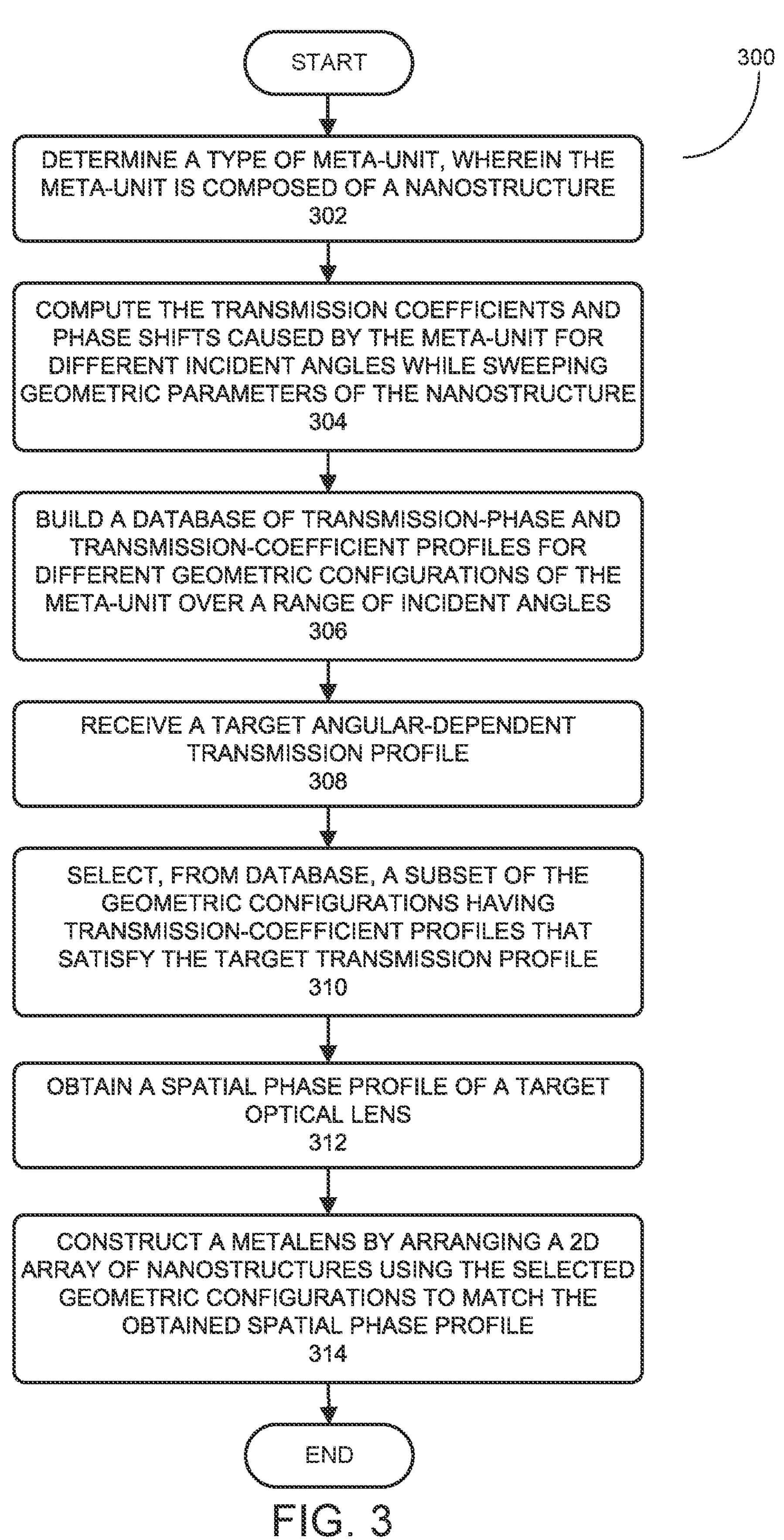
FIG. 3 presents a flowchart illustrating a process of designing a metalens that has a bounded angular FOV, in accordance with the disclosed embodiments.

FIG. 3 presents a flowchart illustrating a process 300 of designing a metalens that has a bounded angular FOV, in accordance with the disclosed embodiments. Process 300 may begin with a determination of a type of meta-unit, wherein the meta-unit is composed of a nanostructure disposed on a substrate support (step 302). In some embodiments, the nanostructure in the meta-unit is a nanopost that has a circular cross-section. Next, the transmission coefficients and phase shifts caused by the meta-unit for incident plane waves at different incident angles are computed while sweeping a number of geometric parameters of the meta-unit (step 304). For example, when the meta-unit is made of a nanopost, sweeping geometric parameters of the meta-unit includes independently sweeping the radius and height of the nanopost. Moreover, sweeping geometric parameters of the meta-unit can include independently sweeping the size of the substrate support in the meta-structure, wherein the size of the substrate support determines a period of a 2D array of the meta-units. Next, a database of transmission-phase and transmission-coefficient profiles for different geometric configurations of the meta-unit over a full range of light incident angles is built (step 306).

Then, a target angular-dependent transmission profile $T(\theta)$ is received (step 308). Specifically, the target angular-dependent transmission profile $T(\theta)$ is a transmission-coefficient curve that decreases with an increasing angle of incidence $\theta$ and drops to zero at a predetermined cutoff angle. Subsequently, from the transmission-profile database, a subset of the geometric configurations of the meta-unit having transmission-coefficient profiles that satisfy the target angular-dependent transmission profile is selected (step 310). The selected subset of geometric configurations of the meta-unit has the transmission-phase profiles that cover the full $2\pi$ range. For a nanopost-type meta-unit, the selected subset of geometric configurations that satisfies the angular-dependent transmission profile can correspond to a range of nanopost diameters with a nanopost height and constant dimensions of the substrate structure.

Next, a spatial phase profile of a target optical lens is obtained (step 312). For example, a spatial phase profile for an ideal convex lens vs. lens radius can be described by Eqn. (1). However, the target optical lens can include any type of optical lens, such as a convex lens, a concave lens, or a deflector. A metalens is then constructed by arranging a 2D array of nanostructures using the selected subset of geometric configurations of the meta-unit to match the transmission-phase at each location of the 2D array to the obtained spatial phase profile (step 314). Note that because the selected subset of geometric configurations of the meta-unit all have the same target angular-dependent transmission profile, the constructed metalens also has the target angular-dependent transmission profile and the bounded angular FOV.

In the disclosed metalens designs, the nanostructures disposed on one side of the substrate support can be either on the object side of the metalens (i.e., the side the illustration light is impinging upon) or on the image side of the metalens (i.e., the side opposite to the surface which the illustration light impinging upon). Which side of the metalens should be used to face the object plane would typically depend on the actual application.

Figure 4:
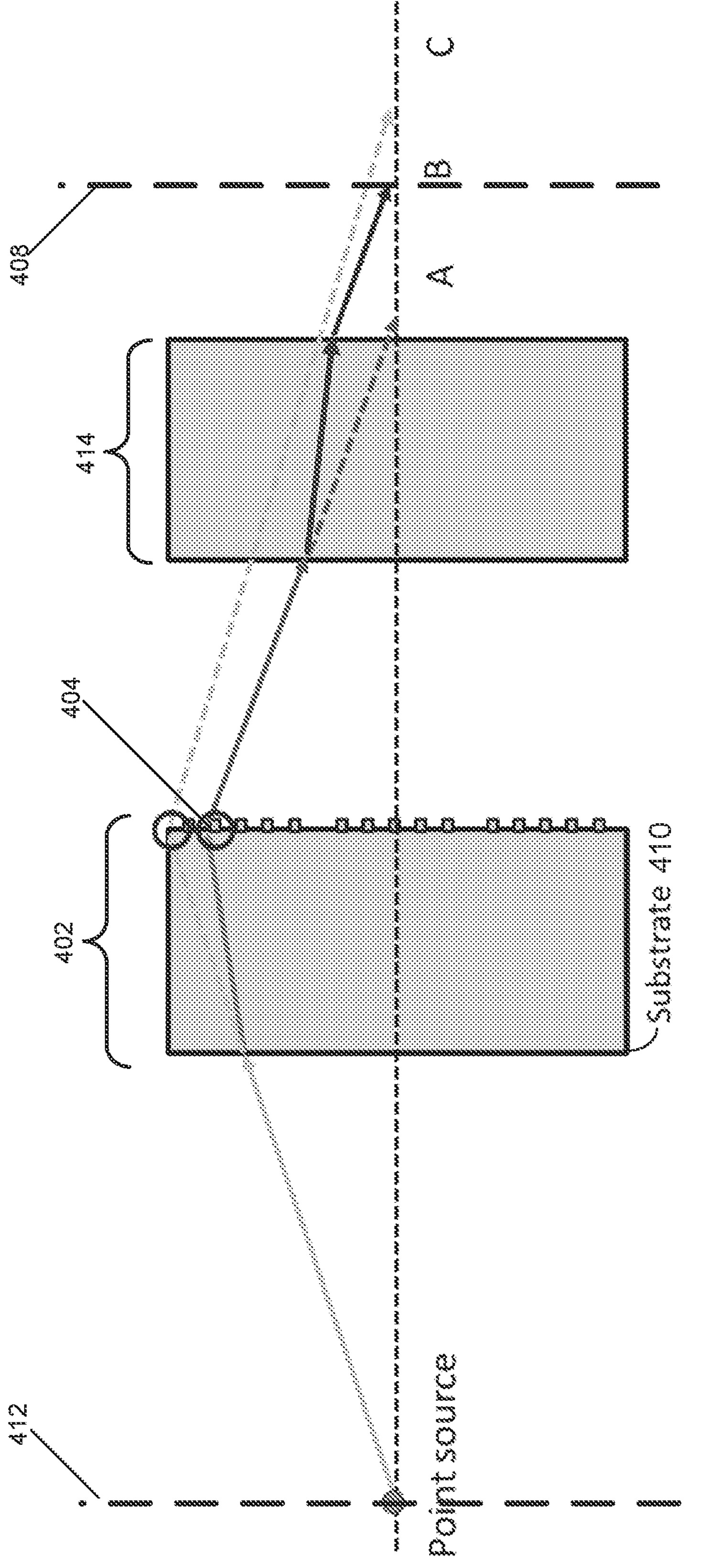
FIG. 4 illustrates an exemplary use case of the disclosed metalens for high resolution 2D imaging, in accordance with the disclosed embodiments.

FIG. 4 illustrates an exemplary use case of a disclosed metalens 402 for high resolution 2D imaging, in accordance with the disclosed embodiments. In the exemplary imaging setup shown, the nanostructures 404 of metalens 402 face and are in proximity to an image sensor in a sensor plane 408 and the substrate 410 of metalens 402 faces an object plane 412. Note that the sensor in the exemplary imaging setup of FIG. 4 is protected by a glass cover 414. In this imaging setup, it is preferable to have the nanostructures 404 face the sensor plane 408 because the substrate 410 of metalens 402 and the sensor cover 414 can cancel the aberration effects from both of these two optical components.

Specifically, without the substrate 410 and cover glass 414, a point source P in object plane 412 will be imaged to a location C beyond sensor plane 408, which is not desirable. When we add in substrate 410, which faces object plane 412 as shown but still without cover 414, point source P will get imaged to location A which is before the sensor plane 408, which is also not desirable. However, when both substrate 410 and cover 414 are included in the imaging system as shown, point source P will be imaged to position B on sensor plane 408, which is the intended location. Hence, by judicially choosing one side of metalens 402 to face toward the object or the sensor, the imaging system setup can cancel the aberration effects from substrate 410 and sensor glass cover 414. Note that in other applications and use cases involving metalens 402, the substrate/nanostructure facing arrangements can be different from the above scenario.

Metalens Array with Bounded Angular FOV for Compact Imaging Systems

The above-described metalens designs with bounded angular FOV generally have small footprints of a few $mm^2$ and, as a result, a limited FOV. While the metalens has comparable-to-wavelength thickness, there is no existing metalens imaging system that provides both compactness and a large FOV. This is mainly because existing high numerical aperture (N.A.) metalens designs also are associated with high geometric aberrations in the image planes and the non-paraxial imaging conditions (described below in conjunction with FIG. 5A). Hence, this disclosure also provides embodiments of a metalens array based on the disclosed metalens to achieve a large overall FOV for large FOV 2D imaging while keeping the device compact.

Figures 5A, 5B, 5C:
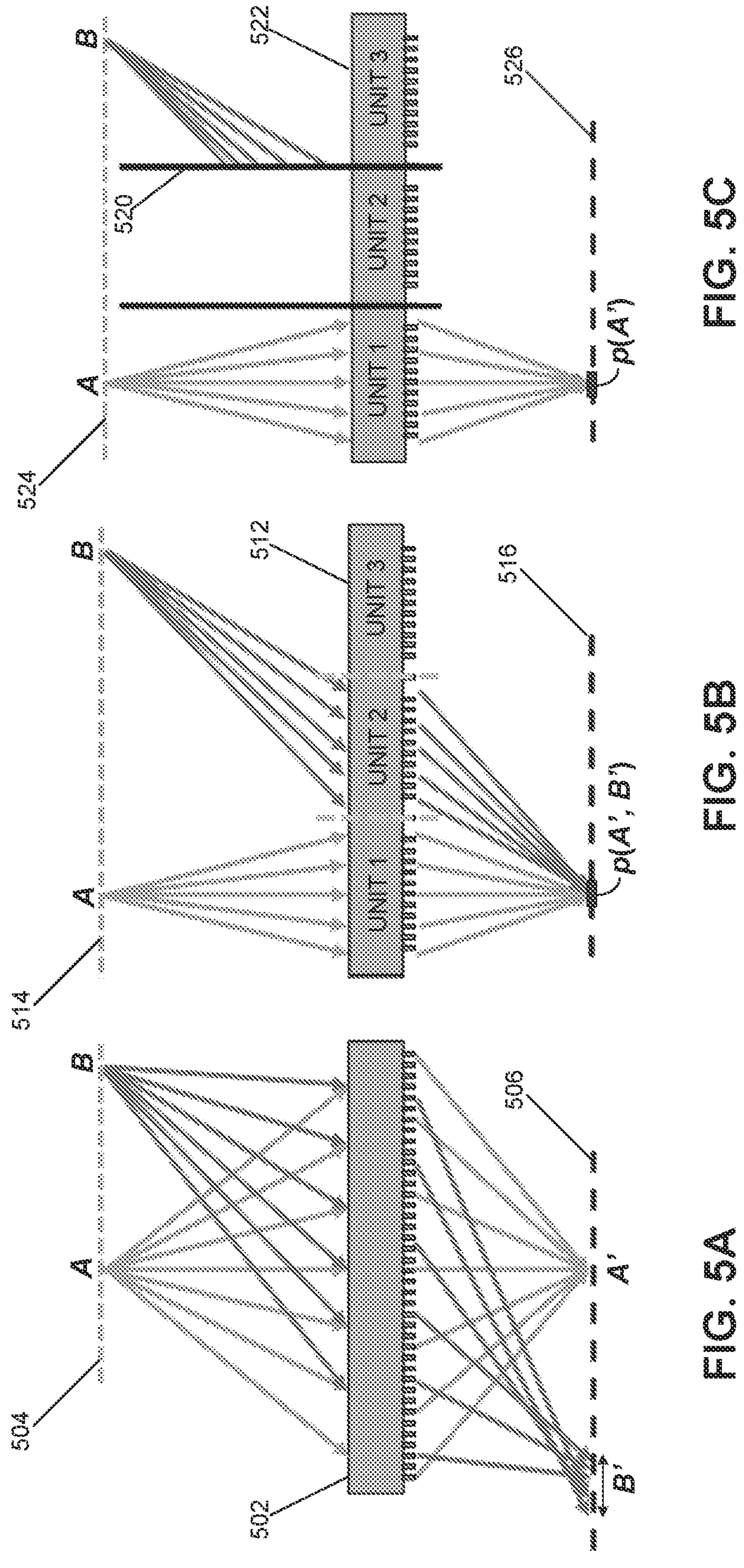
FIG. 5A shows imaging quality degradation associated with a conventional metalens having a large numerical aperture (N.A.) when the paraxial condition is no longer valid.
FIG. 5B shows the side-view of a conventional metalens array that is composed of multiple small N.A. metalenses in each dimension.
FIG. 5C shows a metalens array wherein the metalens units are divided by physical barriers to control light sources with large incident angles.

To design a compact imaging system, the focal length of the metalens should be sufficiently small. On the other hand, to increase the FOV of the metalens, the total surface area/footprint of the metalens should be sufficiently large. These two requirements would lead to certain high N.A. metalens designs that would violate the paraxial condition, thereby rendering a low-quality image due to strong aberration. For example, FIG. 5A shows the imaging quality degradation associated with a conventional metalens 502 having a large N.A. when the paraxial condition is no longer valid. As can be seen in FIG. 5A, the large footprint/surface area of metalens 502 causes a high incident-angle point B in the object plane 504 to become blurred in the sensor plane 506 as a result of geometric aberration of high N.A. metalens 502.

One technique for overcoming the constraint of the paraxial condition on the N.A. of the metalens design is to use a lens array instead of a single large-footprint lens, wherein each lens unit in the lens array will have a small N.A. and operate under the paraxial condition. FIG. 5B shows the side-view of a conventional metalens array 512 that is composed of multiple small N.A. metalenses in each dimension (but only one dimension is shown). As can be seen in FIG. 5B, a single pixel, e.g., pixel p on the sensor plane 516 not only collects small FOV transmitted light from its nearest metalens unit, e.g., metalens unit 1, but also large FOV transmitted light from neighboring metalens units in metalens array 512, e.g., metalens unit 2. As a result, two object points A and B in the object plan 514 can both be imaged onto pixel p on the sensor plane 516 as shown. This inherent crosstalk between neighboring lens units at a given pixel in the sensor plane causes signal ambiguity and makes it difficult to reconstruct an object in the object plane based on the image in the image plane.

To mitigate the crosstalk problem associated with the conventional metalens array designs, extra components, such as a physical barrier or a main lens with matched numerical aperture with the lens units in the metalens array, can be combined with the conventional metalens arrays to control the lens crosstalk. For example, FIG. 5C shows a metalens array 522 wherein the metalens units are divided by physical barriers to control light sources with large incident angles. As can be seen in FIG. 5C, emitted light from object point B in object plane 524 can be blocked by a barrier 520 and therefore can no longer reach pixel p in sensor plane 526 where the image of object point A is present. However, either using additional physical barriers or a separate main lens as shown in FIG. 5C significantly increases the metalens fabrication complexity, cost, and the overall system footprint.

Figures 6A, 6B, 6C:
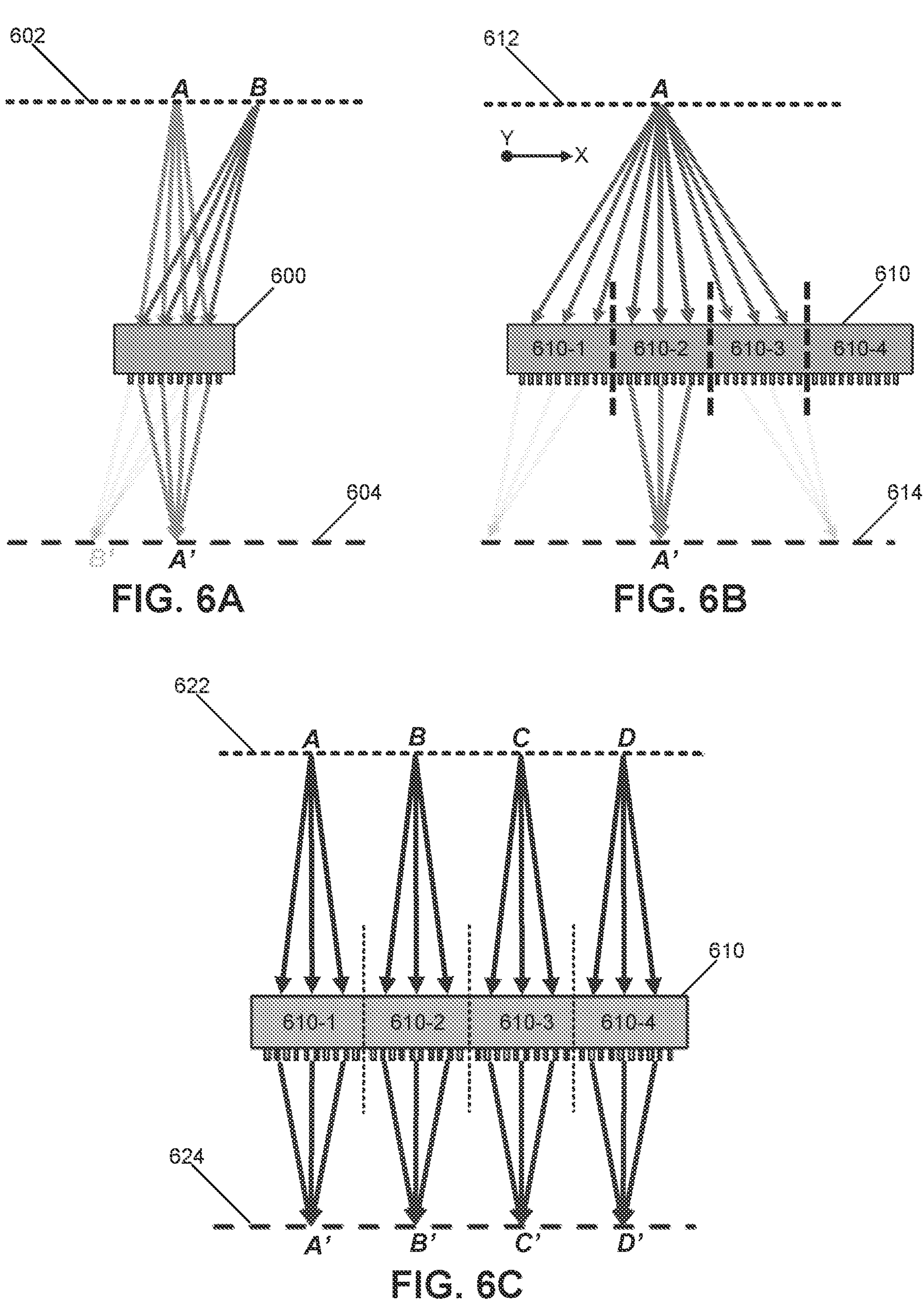
FIG. 6A shows a single metalens having a bounded angular FOV and a bounded linear FOV in an object plane, in accordance with the disclosed embodiments.
FIG. 6B shows a side-view of a disclosed metalens array based on the metalens having a bounded angular FOV to achieve a large FOV while mitigating crosstalk between neighboring metalens units, in accordance with the disclosed embodiments.
FIG. 6C shows the use of the disclosed metalens array to achieve both bounded local FOV for image crosstalk reduction and a large overall FOV in an object plane, in accordance with the disclosed embodiments.

FIG. 6A shows a single metalens 600 having a bounded angular FOV and as such a bounded linear FOV in an object plane 602 in accordance with the disclosed embodiments. As can be seen in FIG. 6A, metalens 600 is configured such that it allows lights with incident angles within a predetermined/designed angular range to pass through while severely attenuating/blocking lights with incident angles outside the predetermined angular range. Note that this predetermined/designed angular range of metalens 600 is also referred to as the bounded angular FOV of metalens 600. For example, light rays emitted from object point A in object plane 602, which is within the bounded FOV of metalens 600, have incident angles that are within the predetermined angular range (i.e., the bounded angular FOV), and hence can pass through metalens 600 and produce a well-defined, strong image A' on a sensor plane 604. In contrast, light rays emitted from object point B in object plane 602, which is outside of the bounded FOV of metalens 600, mostly have incident angles that are beyond the predetermined angular range (i.e., the bounded angular FOV), and hence are mostly rejected by metalens 600. In other words, the intensities of the light from object point B are greatly attenuated after metalens 600, and at most produce a very weak image B' on sensor plane 604.

To extend the angular FOV and the linear FOV of metalens 600 and at the same time significantly reduce or eliminate the above-described crosstalk on the image plane, a metalens array using metalens 600 as the base unit and replicated/tiled together in both dimensions of the lens plane can be constructed. In other words, the constructed metalens array will be composed of a 2D array of metalens 600, wherein each of the metalens unit has the same bounded FOV.

FIG. 6B shows a side-view of a disclosed metalens array 610 based on metalens 600 to achieve a large FOV while mitigating crosstalk between neighboring metalens units, in accordance with the disclosed embodiments. As can be seen in FIG. 6B, metalens array 610 in the first dimension shown is composed of 4 copies of metalens 600 tiled together in the X-dimension shown. However, it should be clear to a person skilled in the art that metalens array 610 further includes 4 copies of metalens 600 tiled to one another in the Y-dimension but which are not visible in FIG. 6B.

Moreover, other embodiments of metalens array 610 can have greater or fewer than 4 copies of metalens 600 in each of the two dimensions. For example, another embodiment of metalens array 610 can have 3 copies of metalens 600 in each of the two dimensions and a total of 9 copies of metalens 600 in the metalens array. Note that while metalens array 610 is constructed with an equal number of single unit 600 in both dimensions, other embodiments of the disclosed metalens array can have different numbers of single metalens unit 600 in the two dimensions. In other words, the disclosed metalens array can generally be an M×N array of single metalens unit 600, wherein M=N in some embodiments, and M≠N in other embodiments.

FIG. 6B shows that light from object point A in object plane 612 reaches different metalens units in metalens array 610 at different angles of incidence. Specifically, for light emitted from object point A and incident on metalens unit 610-2, the incident angles are inside the bounded angular FOV of metalens unit 610-2, and hence can pass through metalens unit 610-2 and produce a well-defined, strong image A' on a sensor plane 614. In contrast, for light emitted from object point A and incident on metalens units 610-1 and 610-3, the incident angles are beyond the bounded angular FOV/cutoff angle of these metalens units, which are copies of metalens 600 with bounded angular FOV, and hence are mostly rejected by metalens units 610-1 and 610-3.

In other words, the intensity of the light from object point A is greatly attenuated by metalens units 610-1 and 610-3 to reduce or eliminate the crosstalk contribution from point A in those regions of the sensor plane. FIG. 6C shows the use of the disclosed metalens array 610 to achieve both bounded local FOV for image crosstalk reduction and a large overall FOV in an object plane in accordance with the disclosed embodiments. As shown in FIG. 6C, the disclosed metalens array 610 can achieve bounded local FOV in each region/sub-area of the object plane 622 using a corresponding metalens unit (e.g., the unit having the smallest angular displacement) in metalens array 610. Moreover, metalens array 610 can simultaneously image all four object points A-D in object plane 622 onto image plane 624 to achieve a wide linear FOV in object plane 622.

To achieve the large-incident-angle light rejections in conventional metalens arrays such as the example shown in FIG. 5C, physical barriers or a main lens would be required, e.g., physical barriers 520. The disclosed metalens array 610 removes the need for such extra components for high-incident-angle light rejections and crosstalk control. Also, the disclosed metalens array 610 can be easily scaled up in both X and Y dimensions to achieve an even larger overall FOV by tiling more metalens units 600 together. A person skilled in the art would appreciate that without using a main lens or physical barriers, the disclosed metalens array 610 can be directly attached to the sample surface on one side of metalens array 610 and to the detector on the other side of metalens array 610, thereby obtaining a highly compact imaging device with a large FOV for microscopic imaging applications.

Figures 7A, 7B:
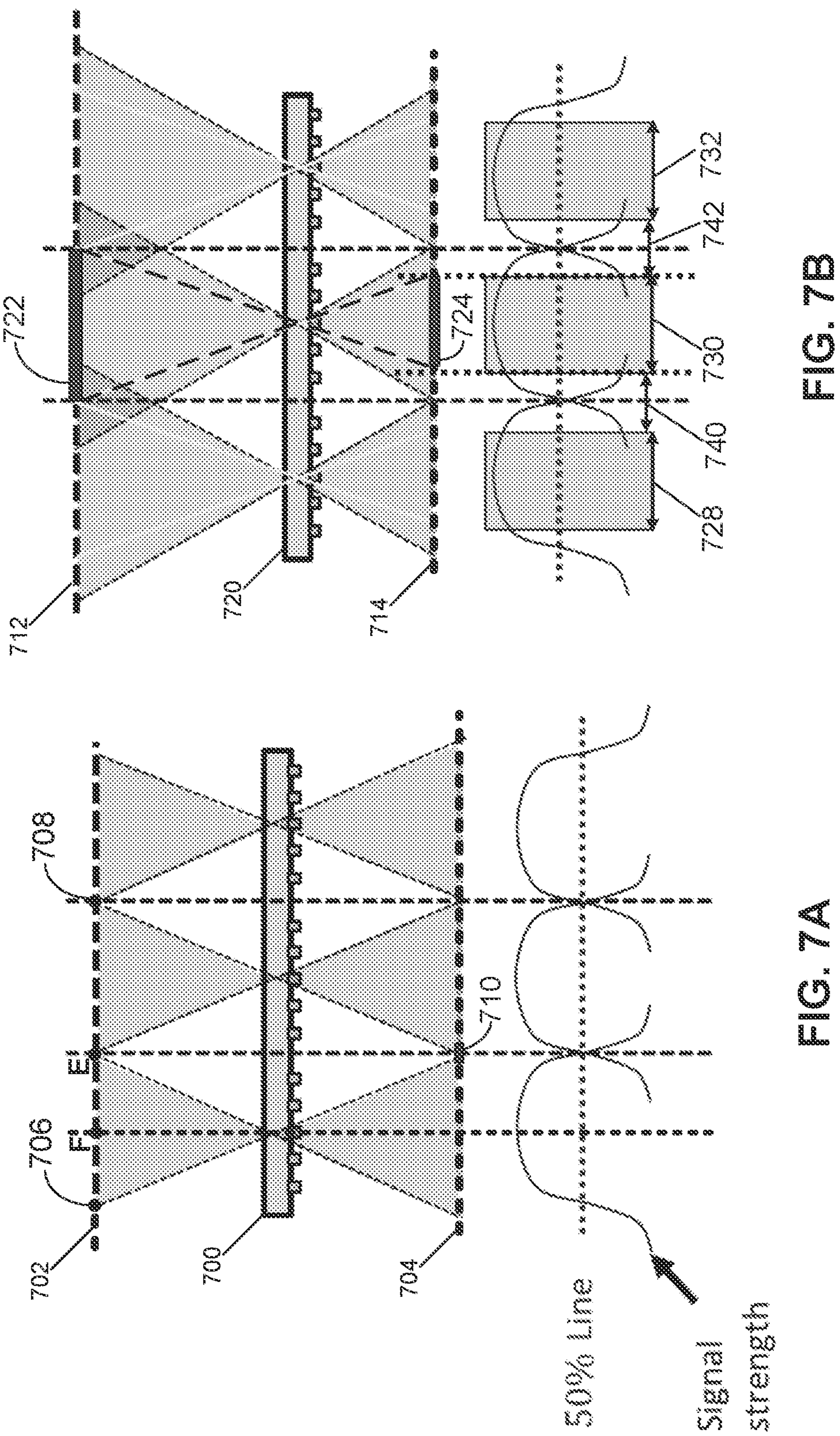
FIG. 7A shows an exemplary technique of calibrating the design of metalens units within a disclosed metalens array by matching the lens N.A. with the bounded angular FOV, in accordance with the disclosed embodiments.
FIG. 7B shows an alternative design of the metalens units within the disclosed metalens array by matching the lens N.A. with the bounded angular FOV, in accordance with the disclosed embodiments.

As discussed above, the disclosed metalens designs have high degrees of design flexibility. This flexibility allows the phase profile of each metalens unit to be customized and/or optimized to achieve better imaging performance instead of simply using the ideal lens phase profile. In some embodiments, when designing the metalens unit for use in the disclosed metalens array, the imaging specifications (e.g., the imaging magnification and lens N.A. of the metalens unit) should be first determined. Specifically, the N.A. of the metalens unit is matched with the bounded angular FOV. FIG. 7A shows an exemplary technique of calibrating metalens units within a disclosed metalens array 700 by matching the lens N.A. with the bounded angular FOV in accordance with the disclosed embodiments.

As can be seen in FIG. 7A, the imaging magnification of each metalens unit of metalens array 700 is set to 1 so that an object in an object plane 702 is imaged to the sensor plane 704 with a 1:1 size ratio. Next, we compute the point spread function (PSF) for a first point source (e.g., point source E) in object plane 702 that has its projection in the lens plane on the boundary between two adjacent metalens units in metalens array 700. We also compute the PSF for a second point source in object plane 702 that is on the optical axis of a given metalens unit (e.g., point source F). The N.A. of the metalens unit is then adjusted until the strength of the PSF for the first point source is substantially half of the strength of the PSF for the second point source, as shown in FIG. 7A. Note that in the design of the metalens unit shown in FIG. 7A, the unity imaging magnification condition can achieve both a maximal imaging resolution in the sensor plane 704 and at the same time a degree of image separations of different objects in object plane 702 projected onto sensor plane 704 by different metalens units in metalens array 700. However, as can be observed in FIG. 7A, a small amount of signal overlap/ambiguity still exists for object points in the in-between unit regions, such as object points 706 and 708, which can be imaged onto the same image pixel 710 in sensor plane 704.

FIG. 7B shows an alternative design of the metalens units within a disclosed metalens array 720 by matching the lens N.A. with the bounded angular FOV, in accordance with the disclosed embodiments. In the exemplary design process of FIG. 7B, the imaging magnification is chosen to be less than 1 (e.g., 0.7) while the signal strength profiles in FIG. 7A are maintained. As a result, an entire object (e.g., object 722) in object plane 712 having the same size as each metalens unit can be imaged onto sensor plane 714 as image 724 and the entire image is inside an effective window 730 that does not overlap with neighboring effective windows 728 and 732 associated with the neighboring metalens units in the metalens array 720. This design technique can achieve a reasonably high imaging resolution in the sensor plane 714, and at the same time avoid the signal overlap/ambiguity for object points in the boundary regions. The regions in sensor plane 714 in between the effective windows, e.g., regions 740 and 742, will have object signal overlapping and therefore can be computationally discarded. In a specific design example, the disclosed metalens array has 3×3 metalens units and each metalens unit has a size of 1 mm×1 mm. Moreover, each lens unit has a focal length of 0.95 mm. The nominal lens to object plane distance is 2.3 mm and the distance between the sensor plane and the metalens array is 1.61 mm. The operating wavelength is 1.31 μm.

Figure 8B:
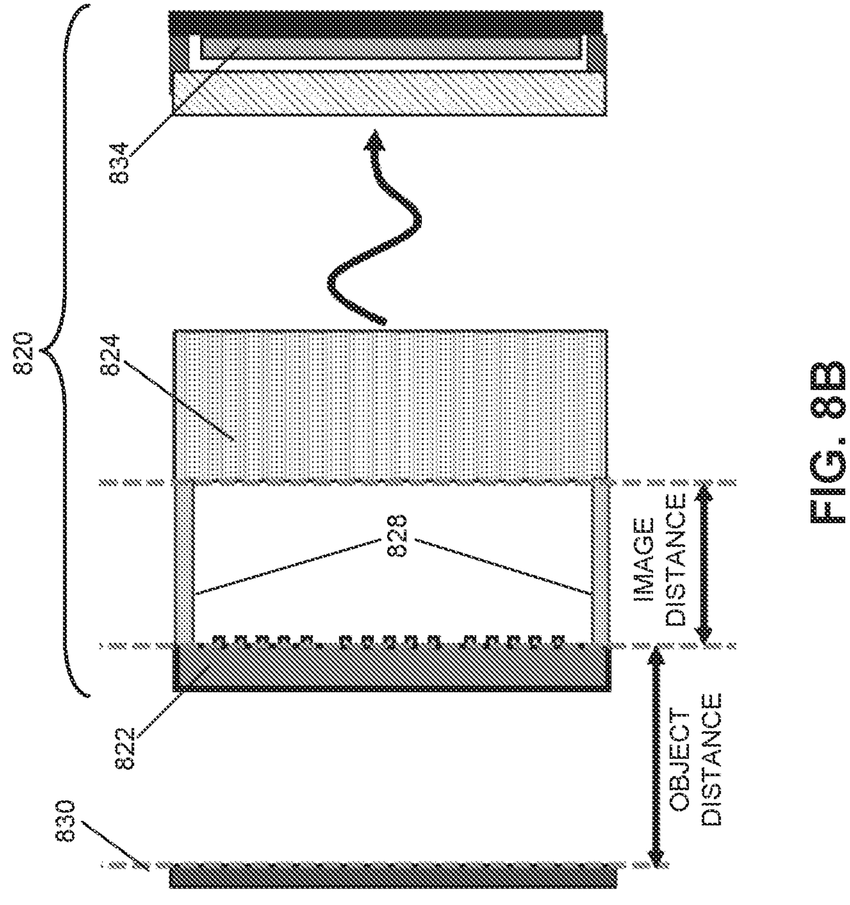
FIG. 8B shows a flexible camera system constructed by coupling a disclosed metalens array to an image sensor through a fiber bundle, in accordance with the disclosed embodiments.
Figure 8A:
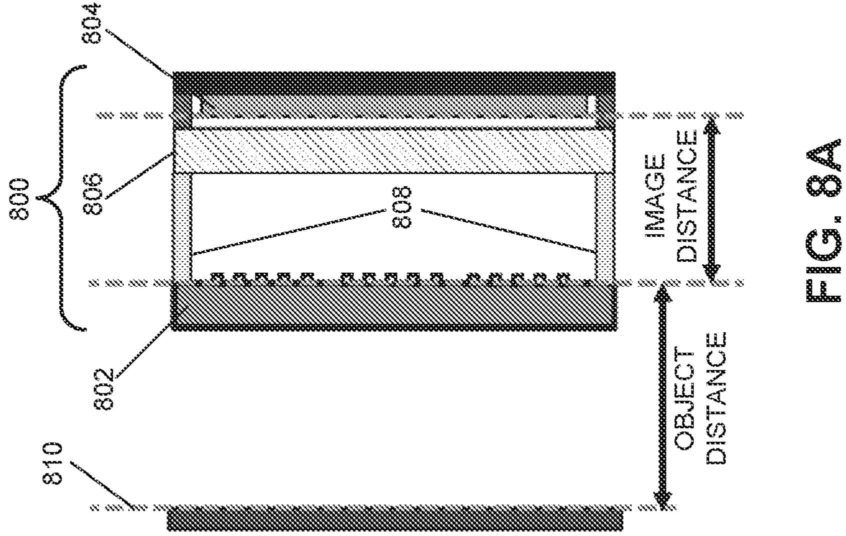
FIG. 8A shows a compact camera system constructed by directly integrating a disclosed metalens array with an image sensor, in accordance with the disclosed embodiments.

FIGS. 8A and 8B show two different setups wherein the disclosed metalens array can be integrated into an imaging system for large FOV microscopic imaging. Specifically, FIG. 8A shows a compact camera system 800 constructed by directly integrating a disclosed metalens array with an image sensor, in accordance with the disclosed embodiments. As can be seen in FIG. 8A, a metalens array 802 is mechanically coupled to an image sensor 804 protected by a cover glass 806 through spacers 808 to form the compact camera system 800. Note that the nanostructures in metalens array 802 are facing image sensor 804 to mitigate the aberration effects as described in conjunction with FIG. 4. In some embodiments, a cable can be used to power up the camera system 800 and to transmit the captured images. Alternatively, the power supply and data transmission can be implemented in the compact camera system 800 through wireless communication means. Because of the compactness of camera system 800, camera system 800 can be attached to a subject at a sample surface 810, e.g., to a mouse skull for brain imaging for neuroscience application, or to a human body to monitor the tissue either on the surface skin or inside the body through endoscopy.

FIG. 8B shows a flexible camera system 820 constructed by coupling a disclosed metalens array to an image sensor through a fiber bundle, in accordance with the disclosed embodiments. As can be seen in FIG. 8B, a metalens array 822 is attached to one end surface of a fiber bundle 824 through spacers 828, wherein the other end surface of fiber bundle 824 is coupled to an image sensor 834. Hence, fiber bundle 824 is used to deliver images formed by metalens array 822 to image sensor 834. Note that in the flexible camera system 820, the part of the device that is attached to the subject at sample surface 830 can be lighter than compact camera system 800. Depending on the specific applications, either the imaging setup of FIG. 8A or the imaging setup of FIG. 8B can be used.

Metasurface Angular Filter

The above-described meta-unit and metasurface with angular-dependent transmission coefficient can also be used to construct angular filters. An angular filter is a type of optical device that has a limited acceptance angle for the incident light. Angular filters have found a wide range of applications in optical system designs, such as in optical communications, optical coupling, and imaging applications. Conventionally, an optical filter is typically designed to filter out the undesirable wavelengths of light while keeping the desirable wavelengths of light. An angular optical filter, in addition to possessing the basic property of an optical filter, can also selectively pass incoming light based on a designed angular range. Specifically, if the incoming light has an incident angle greater than a threshold value, i.e., the cutoff angle of the bounded FOV by design, the transmission intensity of the angular optical filter will drop rapidly. For example, FIG. 9A shows a 3D representation and filtering operation of a metasurface angular filter 902 in accordance with the disclosed embodiments. In FIG. 9A, φ is the incident angle, i.e., the angle between the light propagation direction and z-axis, whereas θ is the angle between the projection of light in x-y plane and the x-axis. When metasurface angular filter 902 is properly designed, the light transmission through filter 902 will become close to zero when angle φ is greater than the threshold value/cutoff angle. Note that conventional absorption-based optical filters do not have such angular-dependent light filtering feature.

A grating-like metasurface angular filter has been reported by Q. Y. Qian et al., "*All-dielectric ultra-thin metasurface angular filter,*" *Opt Lett* 44, 3984-3987, 2019. However, this type of metasurface angular filter only works in one dimension. Using FIG. 9A as an example, if the existing metasurface angular filter has worked for an incident light with θ equal to 0, the grating-like metasurface angular filter will not work when θ equal to 90°. Moreover, the existing device will only work partially for incident light with θ angle other than 0° and 90°, because such incident light can always be decomposed into one light component with θ angle equal to 0 and another light component with θ angle equal to 90°.

The disclosed metasurface angular filter with angular-dependent FOV can overcome the deficiencies in the existing metasurface angular filter because it provides a symmetric angular filtering effect. FIG. 9B shows a 2D side-view and a first type of filtering operation of a disclosed metasurface angular filter 912 in accordance with the disclosed embodiments. As can be seen in FIG. 9B, the incident angle β of the incoming light is less than the designed cutoff angle of metasurface angular filter 912. As such, the transmitted light of the incoming light can have a high intensity.

In contrast, FIG. 9C shows the same 2D side-view but the second type of filtering operation of the disclosed metasurface angular filter 912, in accordance with the disclosed embodiments. As can be seen in FIG. 9C, the angle β of the incoming light is greater than the designed cutoff angle of metasurface angular filter 912, which results in the incident light being rejected by disclosed metasurface angular filter 912, i.e., having a very small or zero transmission as shown. As can be observed from both FIGS. 9B and 9C, unlike the disclosed metalens that is required to provide specific spatial phase retardance, the disclosed metasurface angular filter does not need to have a phase profile to change the wave propagating direction. Consequently, all the meta-units that form the disclosed metasurface angular filter can be identical. This means that to design such an angular filter, we can simply choose a nanopost geometric configuration (e.g., choosing a particular nanopost radius) that provides the desired bounded angular FOV.

Metalens Array with Bounded Angular Field-of-View for 3D Imaging

In addition to 2D imaging, the metalens array can also perform snap shot (or single shot) three-dimensional (3D) imaging by projecting 3D scenes/objects into a single 2D image on an image/sensor plane. The 3D scenes/objects can then be computationally reconstructed from the obtained 2D image. Generally speaking, for 3D imaging, a metalens array is designed with metalens units that have a greater cutoff angle, i.e., a greater angular FOV, than metalens units used in a metalens array for 2D imaging. This means that a metalens unit used in a metalens array for 3D imaging will generally have a wider angular-dependent transmission profile T(θ) and a larger cutoff angle than the transmission profile T(θ) and the corresponding cutoff angle of a metalens unit used in a metalens array for 2D imaging. This wider T(θ) with the greater cutoff angle allows a single object in the object plane to be imaged into multiple copies in the image plane. However, illuminations from the object that are above the cutoff angle will be rejected by the metalens array.

Figures 10A, 10B:
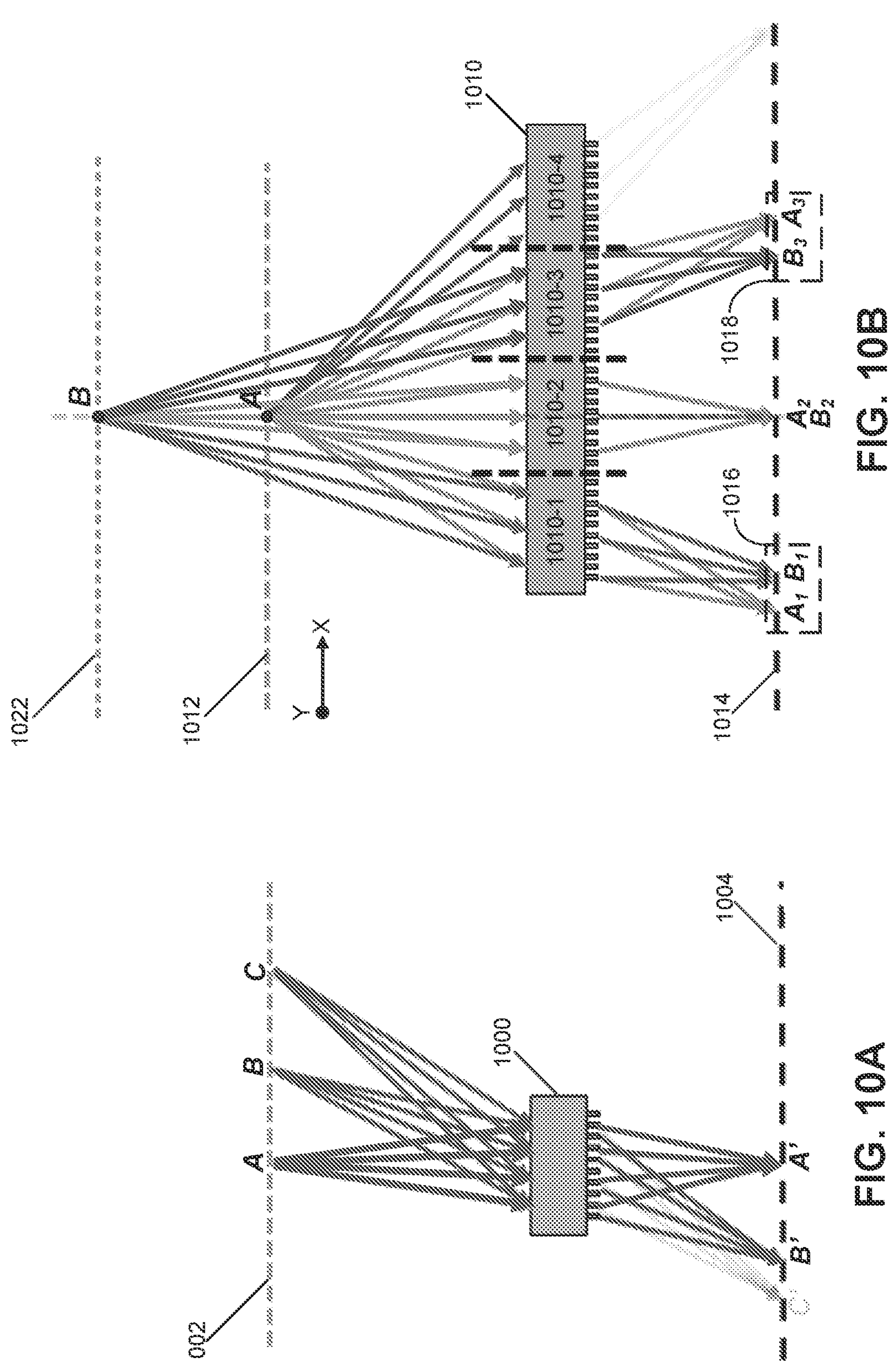
FIG. 10A shows the concept of designing a metalens unit having a proper angular FOV and cutoff angle for use in a metalens array for 3D imaging, in accordance with the disclosed embodiments.
FIG. 10B shows a side-view of a disclosed metalens array constructed based on the metalens in FIG. 10A for 3D imaging, in accordance with the disclosed embodiments.

FIG. 10A shows the concept of designing a metalens unit 1000 having a proper angular FOV and cutoff angle for use in a metalens array for 3D imaging in accordance with the disclosed embodiments. As can be seen in FIG. 10A, metalens 1000 is configured such that it allows light rays with incident angles within a predetermined bounded angular FOV to pass through while severely attenuating/blocking lights with incident angles outside the predetermined bounded angular FOV. For example, light from object points A and B in the object plane 1002 and impinging upon metalens 1000 is within the bounded angular FOV of metalens 1000. As a result, object points A and B are clearly imaged onto a sensor plane 1004 to produce strong images A' and B'. In comparison, the metalens unit 600 in FIG. 6A used in a metalens array for 2D imaging has a smaller bounded angular FOV and corresponding cutoff angle, which resulted in the rejection of object point B in image plane 604. However, light from object point C in object plane 1002 of metalens 1000, which is outside of the bounded angular FOV of metalens 1000, is greatly attenuated after metalens 1000, and at most produces a very weak image C' on sensor plane 1004.

FIG. 10B shows a side-view of a disclosed metalens array 1010 constructed based on metalens 1000 in FIG. 10A for 3D imaging, in accordance with the disclosed embodiments. As can be seen in FIG. 10B, metalens array 1010 is composed of 4 copies of metalens 1000 tiled together in the X-dimension shown. However, it should be clear to a person skilled in the art that metalens array 1010 also includes 4 copies of metalens 1000 tiled to one another in the Y-dimension. Moreover, other embodiments of metalens array 1010 can have greater or fewer than 4 copies of metalens 1000 in each of the two dimensions. For example, another embodiment of metalens array 1010 can have 3 copies of metalens 1000 in each of the two dimensions and a total of 9 copies of metalens 1000 in the metalens array. In some embodiments, a disclosed metalens array for 3D imaging can tile different numbers of single metalens unit 1000 in the two dimensions, e.g., 4 copies of metalens 1000 in the X-dimension and 3 copies of metalens 1000 in the Y-dimension.

FIG. 10B also shows that light from object point A in the first object plane 1012 and on the optical-axis of the second metalens unit 1010-2, reaches different metalens units in metalens array 1010 at different angles of incidence. In some embodiments, the cutoff angle of metalens 1000 is designed such that the incident angles from object point A are inside the bounded angular FOVs of three metalens units: 1010-1, 1010-2, and 1010-3. As a result, three copies of images of object point A are produced in the image plane 1014: image $A_2$ in the middle as the center image; and image $A_1$ and image $A_3$ on either side of the center image $A_2$. However, for the light from object point A and incident on metalens unit 1010-4, the incident angles are beyond the bounded angular FOV/cutoff angle of metalens 1000, and hence are rejected by metalens unit 1010-4.

For the exemplary 3D imaging, FIG. 10B also shows a second object point B that is positioned directly behind object point A and in the second object plane 1022 at a greater object distance from metalens array 1010 than object point A in the first object plane 1012. Similar to object point A, object point B is also projected in the image plane 1014 three times to produce three images: image $B_2$ in the middle as the center image and overlapping with image $A_2$; and image $B_1$ and image $B_3$ on either side of the center image $B_2$ but with a lateral offset from image $A_1$ and image $A_3$ of object point A, respectively, so that the other two images of object points A and B do not overlap.

After projecting 3D object positions through metalens array 1010 onto the 2D image plane 1014, a computational technique can be used to distinguish images of two or more objects from different object distances but are within a small area close to each other on the image plane 1014, e.g., image $A_1$ and image $B_1$ within a small area 1016, and image $A_3$ and image $B_3$ within a small area 1018, respectively. In some embodiments, metalens array 1010 can be configured to generate K×L copies of images in image plane 1014 for each object in the 3D object space, wherein K and L can be determined based on the specific computational technique used to distinguish 3D objects in the 2D image plane. In some embodiments, K=L; while in some other embodiments, K≠L.

In the embodiment shown in FIG. 10B as an example, three images for each object generated in a single dimension means that a total of 3×3 copies of images are generated in the 2D image plane. This means that metalens array 1010 may need only 3×3 metalens units. In other embodiments, two copies of images for each object in each dimension, and 2×2 copies of images in the 2D image plane may be sufficient to distinguish object A from object B. Note that the number of copies of images required to distinguish 3D objects in the 3D image plane 1014 may be determined by the sparsity of the objects being imaged.

Depending on the spatial phase profile of each metalens, we can build different types of metalens array for 3D imaging. In the conventional design, each metalens unit can have an ideal lens phase profile:

$$\varphi(r) = -\frac{kr^2}{2f}, \quad (2)$$

wherein κ is the wavevector, f is the designed focal length, and r is the radius. However, this metalens design technique has a tradeoff between resolution and depth of view. For high-resolution imaging, there is generally a very limited number of resolvable axial layers. To extend the 3D imaging volume while maintaining a good imaging resolution, each metalens unit can be designed so it has an extended depth of view. Similar to the 2D imaging, the metalens array can be directly attached to the sample surface and the image sensor due to the absence of main lens, thus achieving a compact large FOV 3D camera for microscopic imaging application. The specific metalens-sensor integration setups can be either one discussed above in conjunction with FIGS. 8A and 8B. An exemplary design of a metalens array for 3D imaging has the following specifications: 5×5 metalens units with each metalens unit of size 1 mm×1 mm; an effective focal length of 1.75 mm; an object distance of 3.85 mm; and a distance between the sensor and metalens of 1.88 mm.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only.

They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A metalens having a bounded angular field of view, comprising:

a substrate; and a two-dimensional (2D) grid, over the substrate, dividing the substrate into a 2D array of meta-units, wherein each meta-unit in the 2D array comprises:

a nanostructure; and a portion of the substrate that supports the nanostructure, wherein each meta-unit is configured with an angular-dependent transmission or reflection coefficient that decreases with an increasing incident angle of an illumination and a predetermined cutoff angle when the angular-dependent transmission or reflection coefficient becomes substantially zero; and wherein the metalens passes an incident light having an incident angle less than the predetermined cutoff angle and rejects an incident light having an incident angle greater than the predetermined cutoff angle.

2. The metalens of claim 1, wherein the nanostructure includes one of:

a nanapost; and a nanohole/nanowell.

3. The metalens of claim 2, wherein the nanostructure is a nanopost having a circular cross-section and specified by a diameter and a height.

4. The metalens of claim 3, wherein different nanoposts inside different meta-units in the 2D array have different diameters.

5. The metalens of claim 1, wherein the metalens has a center location, and wherein a plurality of nanoposts in the 2D array that have substantially the same distance to the center location have the same diameter.

6. The metalens of claim 1, wherein when the metalens is used for imaging an object, either the nanostructure side of the metalens or the substrate side of the metalens can be selected to face the object.

7. The metalens of claim 1, wherein each nanostructure can be positioned inside the respective meta-unit either at the center of the meta-unit or at an off-centered position.

8. The metalens of claim 1, wherein the metalens is configured to have a spatial phase-shift profile for a given wavelength that mimics a target spatial phase-shift profile of a conventional optical lens.

9. The metalens of claim 8, wherein each nanostructure inside a given meta-unit in the 2D array is configured to effectuate an amount of phase-shift on an incident light at the given wavelength based on the target spatial phase-shift profile and a distance between the nanostructure and the center location of the metalens.

10. The metalens of claim 1, wherein the nanostructure is made of polysilicon and wherein the substrate is made of fused silica.

11. The metalens of claim 1, wherein the metalens is used to construct a lens element within a compact optical imaging system configured for either transmission-mode or reflection-mode 2D imaging.

12. The metalens of claim 1, wherein the metalens is used to construct a lens element within a compact optical imaging system configured for transmission-mode or reflection-mode three-dimensional (3D) imaging.

13. The metalens of claim 1, wherein the 2D array of meta-units has a constant spacing between adjacent meta-units in one or both dimensions of the 2D array.

14. A metasurface angular filter, comprising:

a substrate; and a two-dimensional (2D) grid, over the substrate, dividing the substrate into a 2D array of meta-units, wherein each meta-unit in the 2D array comprises:

a nanostructure; and a portion of the substrate that supports the nanostructure, wherein each meta-unit in the 2D array of meta-units is configured with an angular-dependent transmission profile so that the metasurface angular filter:

passes incoming light wave having an angle of incident less than a predetermined acceptance angle; and rejects or significantly attenuates incoming light wave having an angle of incident greater than the predetermined acceptance angle.

15. The metasurface angular filter of claim 14, wherein after passing through the metasurface angular filter, the angle of propagation of the first incoming light wave having an angle of incident less than a predetermined acceptance angle is substantially the same as the angle of incident.

16. The metasurface angular filter of claim 14, wherein the angular-dependent transmission profile is symmetric in the 2D plane of the 2D array of meta-units.

* * * * *